United States Patent [19]

Czarnetzki et al.

[11] Patent Number: 5,525,052

[45] Date of Patent: Jun. 11, 1996

[54] EXTRUSION MACHINE

[75] Inventors: Robert Czarnetzki, Deggendorf; Wolfram Lihotzky-Vaupel, Niederalteich, both of Germany

[73] Assignee: Emil Lihotzky Maschinenfabrik, Plattling, Germany

[21] Appl. No.: 202,109

[22] Filed: Feb. 25, 1994

[30] Foreign Application Priority Data

Feb. 26, 1993 [DE] Germany ............... 43 06 014.5

[51] Int. Cl.⁶ ................. B29C 47/08; B29B 9/06
[52] U.S. Cl. ................ 425/183; 425/185; 425/190; 425/196
[58] Field of Search .............. 264/142, 37; 425/184, 425/198, 150, 190, 183, 185, 196, 311, 313

[56] References Cited

U.S. PATENT DOCUMENTS

| | | | |
|---|---|---|---|
| 1,946,740 | 2/1934 | Hall | 425/190 |
| 2,078,100 | 4/1937 | Royle | 425/198 |
| 2,838,084 | 6/1958 | Samler | 425/198 |
| 3,001,485 | 9/1961 | Czik | 425/190 |
| 3,130,468 | 4/1964 | McFall | 425/183 |
| 3,299,474 | 1/1967 | Ashworth, Jr. | 425/183 |
| 3,345,854 | 10/1967 | Gross | 425/183 |
| 3,947,202 | 3/1976 | Goller et al. | 425/183 |
| 4,395,212 | 7/1983 | Lambertus | 425/198 |
| 4,569,815 | 2/1986 | Rentz et al. | 425/190 |
| 5,013,498 | 5/1991 | Froeschke | 264/37 |
| 5,190,772 | 3/1993 | Conselvan et al. | 425/184 |

FOREIGN PATENT DOCUMENTS

| | | | |
|---|---|---|---|
| 3029767 | 5/1982 | Germany | 425/183 |
| 3243184 | 5/1984 | Germany | 425/183 |
| 60-225726 | 11/1985 | Japan | 425/183 |
| 7304519 | 10/1973 | Netherlands | 425/184 |

*Primary Examiner*—James P. Mackey
*Attorney, Agent, or Firm*—Larson and Taylor

[57] ABSTRACT

An extrusion machine has a machine frame, an extrusion press with a material inlet opening and a material outlet opening, a drive for the extrusion press and a die located in the vicinity of the material outlet opening and a cutting tool associated with the drive. In the extrusion press is provided a changer mechanism, which has a support member for at least two changeable dies and/or cutting tools, the support member being movably located in a plane substantially parallel to the plane of the material outlet opening relative to the extrusion press.

21 Claims, 5 Drawing Sheets

EXTRUSION MACHINE

BACKGROUND OF THE INVENTION

The invention relates to an extrusion machine, particularly for the extrusion of chemical granular material, preferably for detergents, having a machine frame, an extrusion press with a material inlet opening and a material outlet opening, a drive for the extrusion press and a die provided in the vicinity of the material outlet opening and a cutting tool associated with said die.

In such known extrusion machines the die is fitted in stationary manner to the extrusion press. The cutting tool is also stationary with respect to the extrusion press. During production with the extrusion press it is necessary at certain intervals to replace the die and/or the cutting tool. For this purpose it is necessary to stop the extrusion press, so that the production process is interrupted. Production must then be started up again after replacing the die or the cutting tool. However, this starting process initially leads to a certain production wastage until the production process has been so readjusted as to obtain the desired quality.

For the extrusion of detergents there are e.g. production processes in which initially dry materials are weighed and are then transported over several floors to a mixer, where various liquids are added to the pulverulent materials. The mixture is then supplied to the extruder. If the production process has to be interrupted as a result of a replacement of a die or a cutting tool on the extruder, a dry product batch remains in the mixer. On recommencing the production plant this dry product must initially be discharged upstream of the extruder, because otherwise the dry product would block the extruder screw. Therefore initially the mixing process must be started up until the mixer supplies a desired extrudable initial product. Before the mixture supplied by the mixer is sufficiently plastic, several hundred kg of material are discharged upstream of the extruder. The checking of the mixture delivered by the mixer normally takes place manually and is therefore very time and labour-consuming. If this preliminary work is not conscientiously carried out during the restarting of the extrusion machine, it is necessary to clean all the product-carrying members of the extruder.

Therefore a replacement of a die or cutting tool in such an extrusion machine not only leads to production losses during the changing operations, but also to a considerable production loss on restarting the extrusion machine.

SUMMARY OF THE INVENTION

Therefore the object of the invention is to so further develop an extrusion machine of the aforementioned type that production interruptions for changing a die and/or tool are as far as possible completely avoided.

This object is achieved for the inventive extrusion machine noted above, in that a changer mechanism is provided, which has a support member for at least two replaceable dies and/or cutting tools and that the support member is movably arranged in a plane substantially parallel to the plane of the material outlet opening relative to the extrusion press.

As a result of the changer mechanism it is possible during the production process to rapidly and easily replace the die and/or cutting tool, because it is quickly possible to "switch" between two tools and the new tool is moved in front of the opening of the extrusion press, whereas the used tool is moved out of the extrusion press opening and can then be removed from the changer mechanism and then overhauled or cleaned.

The invention obviates any need for a stoppage to the production process for a die or cutting tool change and the resulting production losses no longer occur. The extrusion machine and the machines upstream thereof can operate continuously.

The changer mechanism support member can either have only the cutting tools or the dies and then the cutting tool or die is positioned in stationary manner with respect to the extrusion process. According to a particularly preferred development both the dies and the cutting tools are received by the support member, so that the changer mechanism can change both the dies and the cutting tools. This means that during the die change the operator can simultaneously inspect and monitor the cutting tool and if necessary decide whether the cutting tool should also be replaced or can continue in use without replacement.

According to an advantageous development the support member is circular and is mounted in rotary manner in a changer casing fitted eccentrically to the extrusion press in the vicinity of its material outlet opening. If the dies and/or cutting tools are arranged on a circular path concentric to the support member fulcrum, by simply rotating on the support member one die after the other can be positioned upstream of the extrusion press outlet opening. Due to the rapid die change, this "turret-like" arrangement also permits a troublefree production change.

According to a further development the support member is pitch circular and is pivotably mounted in a changer casing fitted eccentrically to the extrusion press in the vicinity of its material outlet opening. This construction is used in preferred manner if only two or three dies or cutting tools have to be replaced, which then takes place by a reciprocating or pendulum movement of the support member. Whilst one die or cutting tool is in operation, the other tool can be replaced.

If the dies and/or cutting tools have the same radial spacing from the rotation or pivot axis of the support member, the tool change can take place by a simple rotary or pivoting movement about the support member axis.

According to another advantageous development of the invention the support member is received in a substantially translatory manner in a changer casing fitted to the extrusion press in the vicinity of its material outlet opening, the die and/or cutting tool arrangements being juxtaposed in the displacement direction. This construction constitutes an alternative to the construction having the reciprocating support member, so that here again the same advantages can be obtained.

It is also advantageous if the cutting tool is formed by a knife arrangement mounted in rotary manner on the die side facing the extrusion press and which is subject to the action of a cutting drive. With such a rotary knife system the knives are in direct contact with the die or are pressed onto the latter during rotation. The knife arrangement speeds can be between a few and several thousand revolutions per minute. For this purpose between the drive and the cutting tool a gear is provided, which is preferably steplessly variable, but the drive can also be steplessly variable. A particularly compact construction is ensured if there is at least one shift gear in the drive line between the cutting drive and the cutting tool.

If at least one differential shaft is provided in the drive line between the cutting drive and the cutting tool, only minor vibrations occur even at high cutting tool speeds.

If the changer arrangement is fitted in tilting, hinge-like manner to the extrusion press, on the one hand this permits an easy replacement of the entire changer arrangement and on the other leads to rapid, easy access to the interior of the extrusion press, so as to facilitate repair and cleaning.

Within the changer system it is possible to provide heating and/or cooling means, should they be necessary for a corresponding production process.

Further advantageous developments of the invention can be gathered from the remaining subclaims.

BRIEF DESCRIPTION OF THE DRAWINGS

The invention is described in greater detail hereinafter relative to an embodiment and the attached drawings, wherein show.

DESCRIPTION OF THE PREFERRED EMBODIMENT

Figure 1:
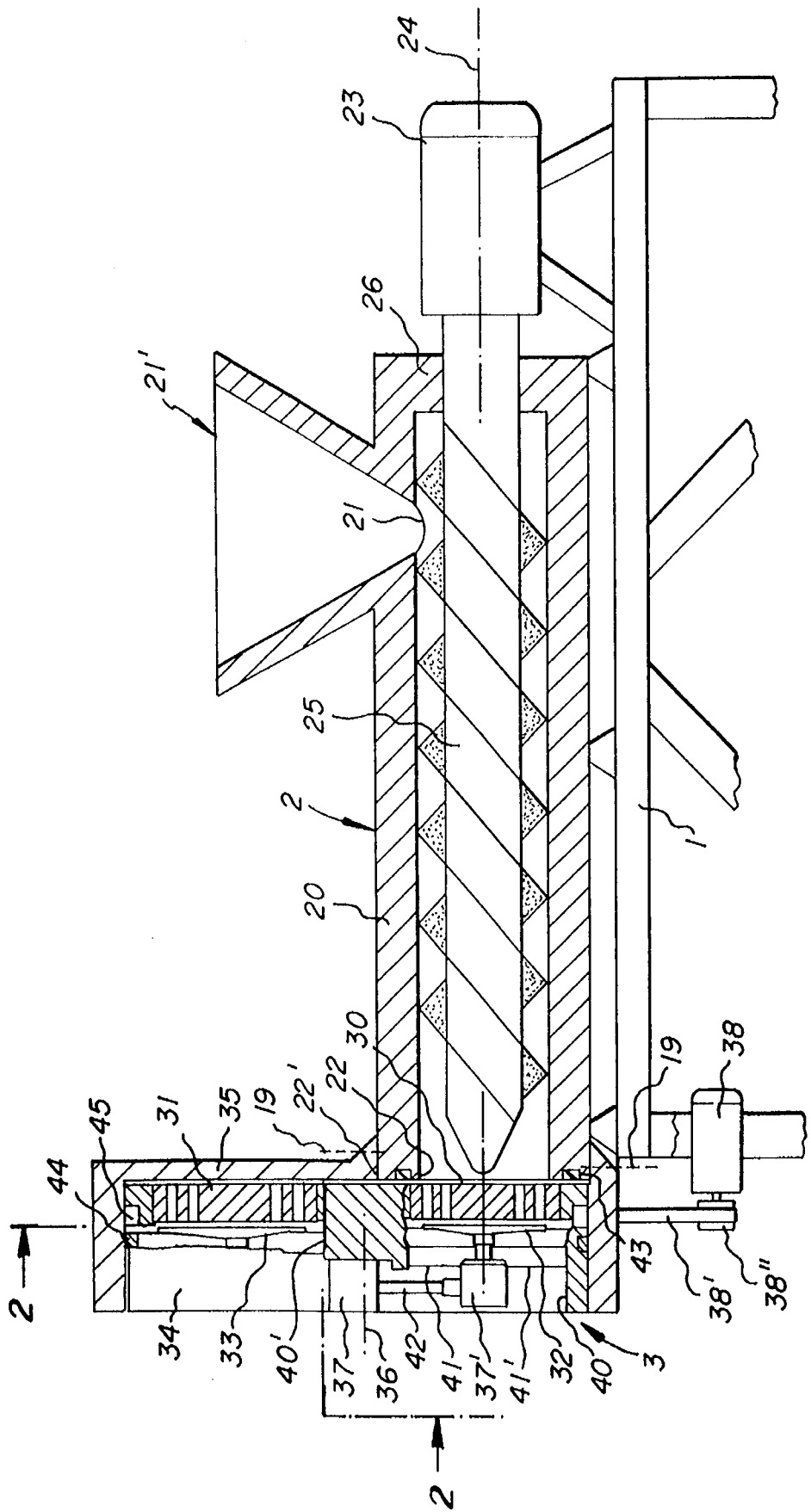
FIG. 1 A sectional side view of an extrusion machine according to the invention.
Figure 2:
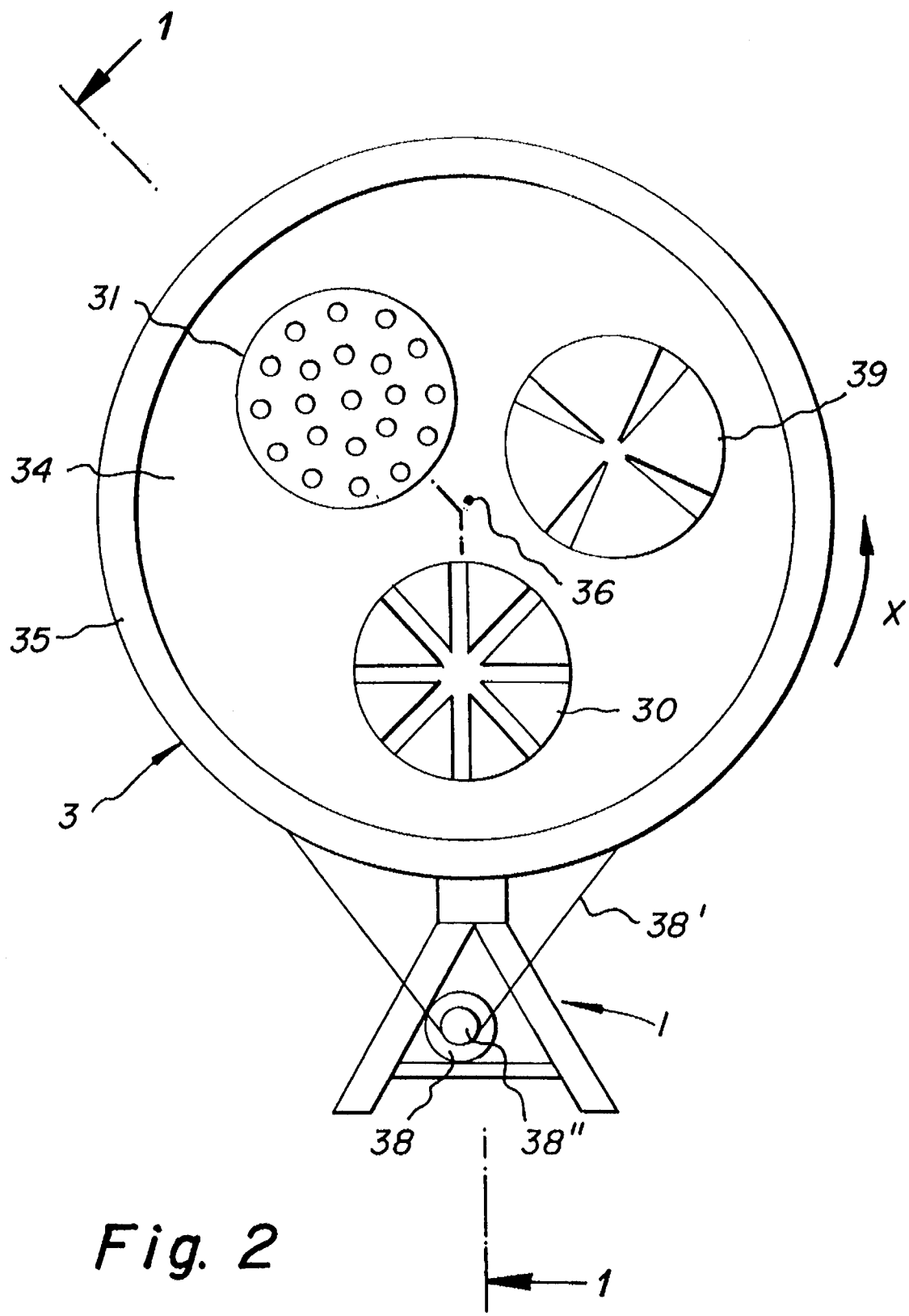
FIG. 2 A front view of the extrusion machine depicted in FIG. 1 taken along section line 2—2, with the corresponding section line 1—1 in FIG. 2 showing the section of FIG. 1.

FIG. 1 shows an extrusion machine, e.g. for the extrusion of farinaceous paste, such as noodles, in accordance with a first embodiment of the invention, in a sectional side view along line 1—1 in FIG. 2. To the diagrammatically indicated machine frame 1 is fixed a cylindrical casing 20 of an extrusion press 2. The cylindrical casing 20 receives a rotary worm shaft 25, which is passed in sealing manner through the end wall 26 provided at a first end of the cylindrical casing 20 and is connected in rotary manner there to a drive motor 23, which is also supported on the machine frame 1. In the vicinity of the end wall 26 the cylindrical casing 20 has a material inlet opening 21, which is constructed in the manner of a filling hopper 21'. The other end of the cylindrical casing 20 forms a material outlet opening 22. The worm shaft 25 ends in the vicinity of the material outlet opening 22.

In the vicinity of the outlet opening 22 a casing 35 of a changer mechanism 3 for dies and cutting tools is fitted to the cylindrical casing 20. The changer casing 35 is circular and is flanged to the cylindrical casing 20 by means of a flange provided eccentrically thereon and fixing can take place in known manner, e.g. by radially positioned screw couplings (indicated by dot-dash lines 19).

In the changer casing 35 a circular support element 34 is arranged concentrically thereto. The support member 34 is mounted in rotary manner in the changer casing 35, the rotation axis 36 of the support member 34 being parallel to the longitudinal axis 24 of the cylinder 20 of the extrusion press 2. Therefore the support member 34 is rotated in a plane parallel to the plane of the material outlet opening 22.

The support member 34 is penetrated by two axially parallel, stepped bores 40, 40', which are so positioned that the spacing between the central axis thereof and the rotation axis 36 of the support member 34 substantially corresponds to the spacing between the rotation axis 36 and the axis 24 of the cylindrical casing 20 of the extrusion press 2. In this way by rotating the support member 34 the bores 40, 40' can be positioned centrally in front of the material outlet opening 22 of the extrusion press 2.

In the bores 40, 40' is in each case placed a die 30, 31, which forms a boundary for the bore 40, 40'. On the side of the die 30, 31 directed away from the material outlet opening 22 is positioned a cutting tool 32, 33, which comprises a rotary mounting support, in which is radially inserted a plurality of knives. The diameter of this knife arrangement, i.e. of the cutting tool 32, 33, substantially corresponds to the diameter of the die 30, 31. The cutting tool 32, 33 is subject to the action of a motor or hydraulic drive 37 and a mitre gear 37'. The mitre gear 37' is centrally held in the bore 40, 40 ' by means of radial supports 41, 41'. A drive shaft 42 extending radially from the mitre gear 37' leads to the motor or hydraulic drive 37, which is fitted in a rear recess of the support member 34.

Between the face 22' of the cylindrical casing 20 in the vicinity of the material outlet opening 22 and the rear face of the support member 34 is inserted a circular seal 43 in known manner. The seal 43 seals the interior of the cylindrical casing 20 of the extrusion press 2 and which is under high pressure with respect to the changer casing 35, so that in this area no leaks occur on passing from the cylindrical casing 20 to the support member 34.

The axial force acting on the support member 34 due to the pressure produced by the extrusion press 2 is absorbed by a rotary radial/axial bearing 44 between the support member 34 and the changer casing 35 and said bearing 44 is only diagrammatically shown.

On its circumference the support member 34 is provided with an all-round groove 45, which is provided on its bottom with teeth and receives a diagrammatically represented drive chain 38'. The drive chain 38' runs over a pinion 38", which is fitted to the shaft of an electric motor 38, which is supported on the machine frame 1. In place of a chain drive for the support member 34 it is also possible to provide a worm, gear, spur, bevel or any other drive or geared motor. If desired, the electric motor can be replaced by a pneumatic or hydraulic motor.

FIG. 2 is a front view of the extrusion machine according to line 2—2 of FIG. 1 in the direction of its arrow 3. The circular support member 34 rotatably about the axis 36 has three dies 30, 31, 39 on a common circular path and which by rotation of the support member 34 in the direction of arrow X by an angle of approximately 120° can be moved in turret-like manner in front of the material outlet opening 22 of the extrusion press 2.

Figure 3:
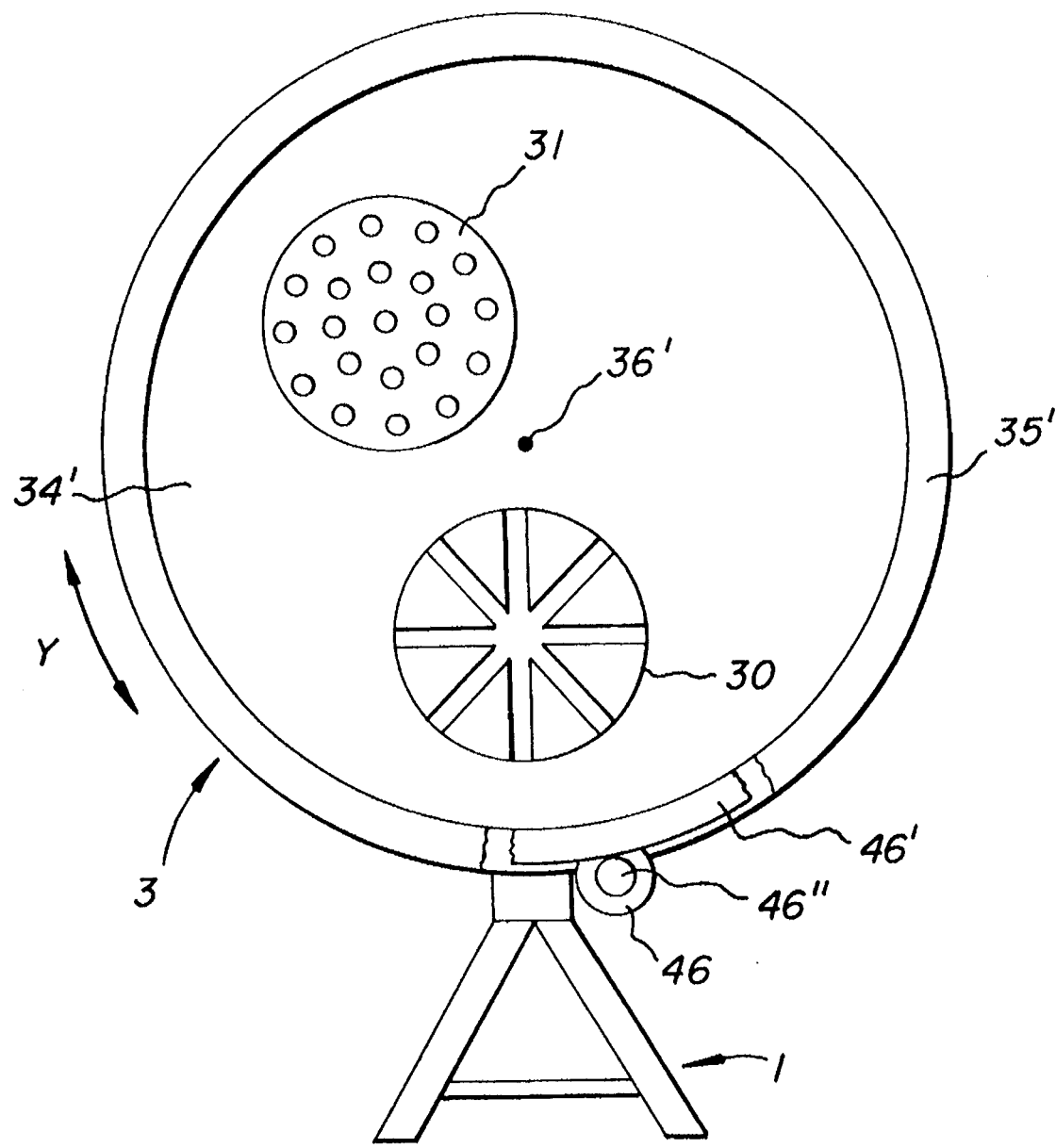
FIG. 3 A view similar to FIG. 2 of a modified extrusion machine with a reciprocating support member.

FIG. 3 is a variant of the extrusion machine of FIG. 2, the support member 34' being pitch circular and having two dies 30, 31. By a reciprocating or pendulum movement corresponding to the double arrow Y in FIG. 3, the dies and the cutting tools associated therewith can be alternately pivoted in front of the material outlet opening 22 of the extrusion press 2. The drive for the pivoting action is provided here by an electric motor 46, to whose shaft is fitted a pinion 46", which is in meshing engagement with a toothed rim 46', the latter being fixed to the circumference of the support member 34'. Thus, by reversing the rotation direction of the electric motor 46, the support member 34' can reciprocate about its axis 36' in the changer casing 35'.

Figure 4:
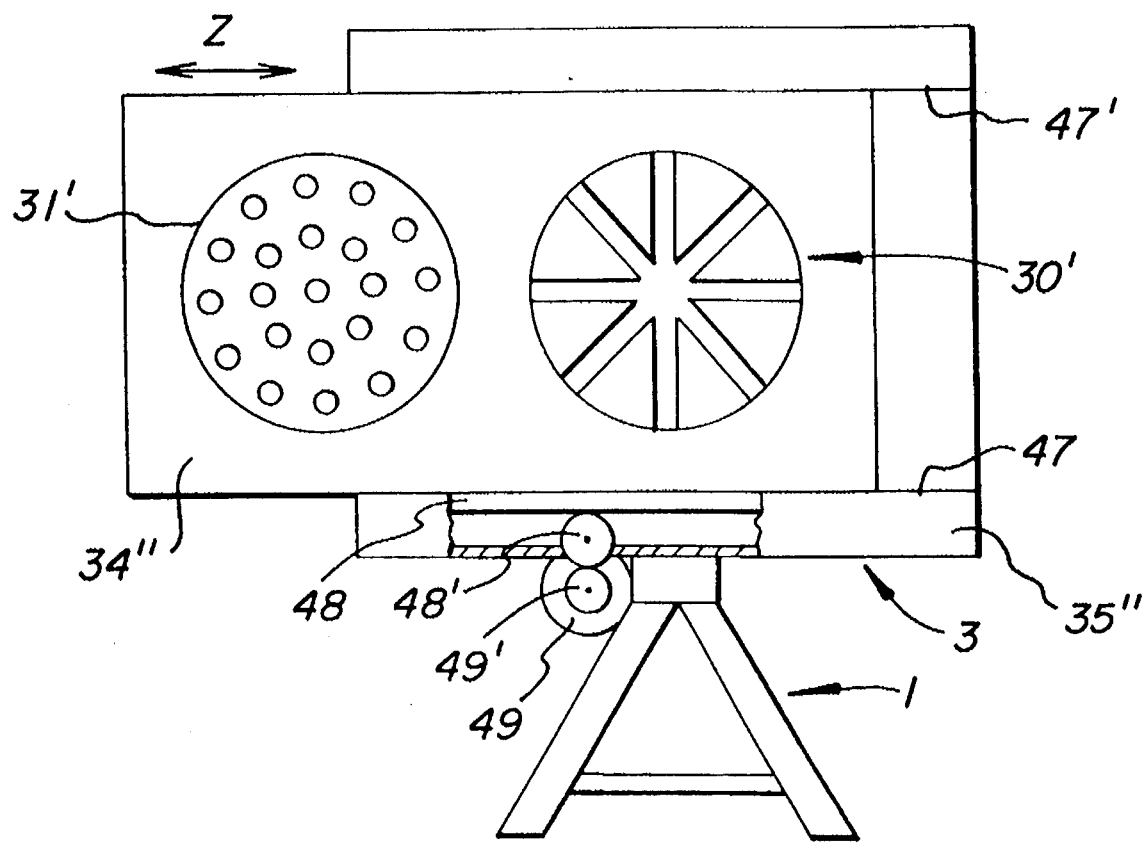
FIG. 4 A view corresponding to FIG. 2 with a support member movable in translatory manner.

FIG. 4 shows an embodiment, in which the changer casing 35" is substantially rectangular and has a lower 47 and an upper 47' rail for receiving the rectangular support member 34". In the support member 34" are horizontally juxtaposed in each case two arrangements 30', 31' from a die and a cutting tool. On its underside the support member 34" is provided with a rack 48, which meshes with a gear wheel 48', which is also in meshing engagement with the pinion 49' of an electric motor 49. Thus, by reversing the rotation direction of the electric motor 49, the support member 34" can be horizontally reciprocated in accordance with the double arrow Z and in the end position one of the arrangements 30', 31' formed by the die and/or cutting tool can be moved in front of the material outlet opening 22 of the extrusion press 2 and the other arrangement is accessible for servicing.

Figure 5:
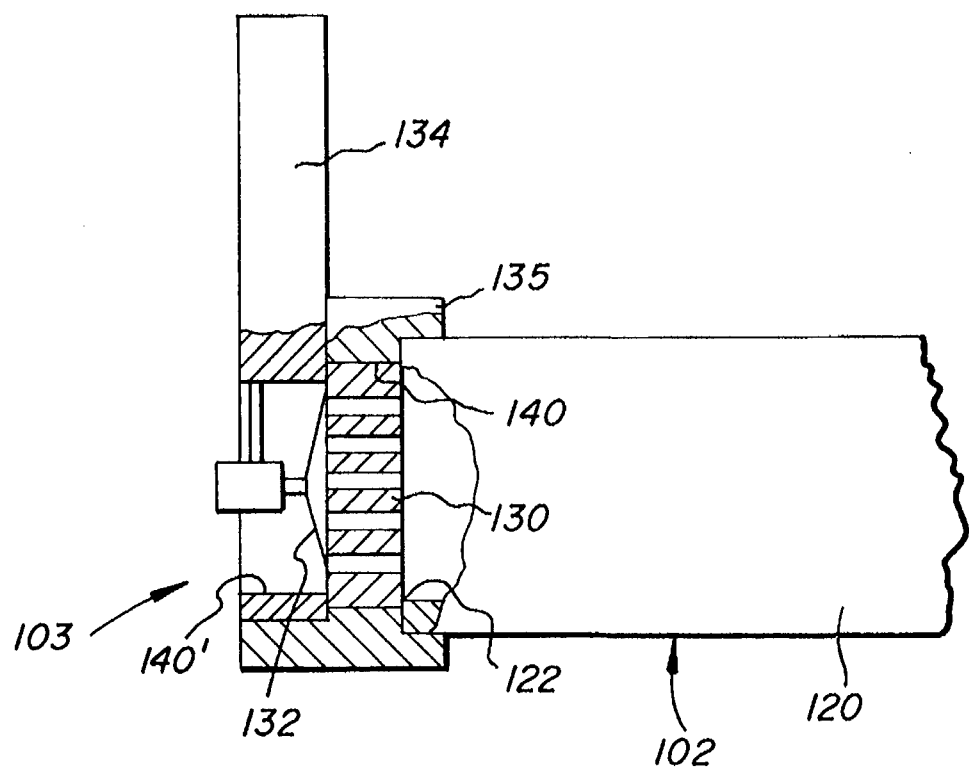
FIG. 5 A diagrammatic side view of an extrusion press with a stationary die and a changeable cutting tool.

A variant of the hitherto described extrusion machine is shown in FIG. 5 with a changer mechanism 103. At the front end of its cylindrical casing 120 the extrusion press 102 is connected in the vicinity of the material outlet opening 122 in the manner described hereinbefore to a changer casing 135. The changer casing 135 has a through bore 140, in which is inserted at the end facing the cylindrical casing 120 a die 130 in stationary, but replaceable manner. On the side of the die 130 remote from the material outlet opening 122 is located a rotary support member, which in the already described manner is rotatable about its axis parallel to the axis of the cylindrical casing 120. The support member 134 has a plurality of bores 140', whereof only one can be seen in FIG. 5. A cutting tool 132 is arranged in the already described manner in each of these bores 140'.

In the case of this extrusion machine by rotating or pivoting the support member 134 in each case a new cutting tool can be introduced behind the die 130. It would obviously also be possible in this case to use the other, already described support member versions.

Figure 6:
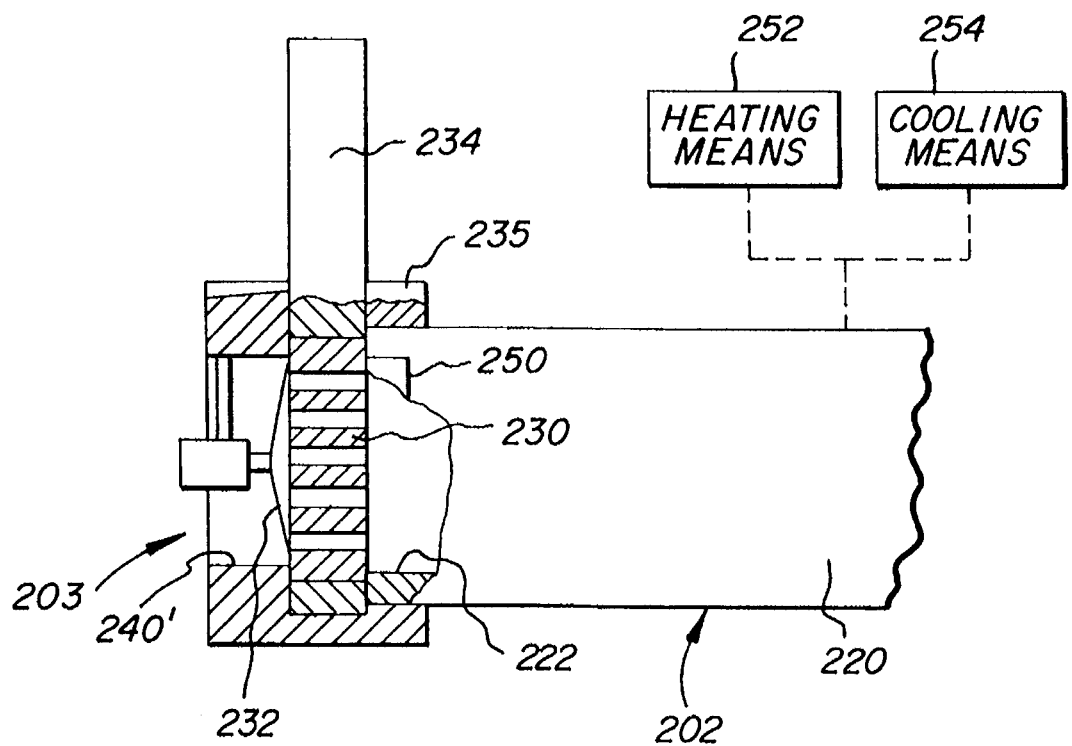
FIG. 6 A diagrammatic, part sectional side view of an extrusion machine with a stationary cutting tool and changeable die.

FIG. 6 shows a construction similar to FIG. 5, but in which the cutting tool 232 is arranged in stationary manner in the bore 240' of the changer casing 235 of changer mechanism 203 behind the die 230 aligned with casing 220 of extrusion press 202. In the rear area of the changer casing 235, on the side of the cutting tool 232 facing the material outlet opening 222, is provided a support member 234, which can be constructed in the same manner as the hitherto described support members. In the support member 234 is provided a plurality of dies 230, whereof only one is shown here. As a result of the rotation, pivoting or translatory movement of the particular support member 234 a changing operation can take place between the dies 230 in the support member 234 and in each case a die 230 is moved into the bore 240' between the material outlet opening 222 and the cutting tool 232. The constructions of FIGS. 5 and 6 can also be combined, so that, as a function of needs, the die or the cutting tool can be changed in a random manner.

The hitherto described embodiments of the extrusion machine according to the invention are based on a horizontal arrangement of the extrusion press and a vertical arrangement of the movement plane of the support member in the changer casing. However, it is equally possible for the extrusion press to be positioned vertically and for the movement plane of the support member in the changer casing to be positioned horizontally and all angles between these extreme positions are also possible. Moreover between the cylinder casing 20 of the extrusion press 2 and the changer casing 35 can be provided an intermediate piece, which produces an angular displacement between the axis 24 of the extrusion press 2 and the rotation axis 36 of the support member 34. The fixing of the changer casing 35 to the cylindrical casing 20 can also take place by means of a hinge, such as hinge 250 partially depicted in FIG. 6 for cylindrical casing 235, so that the changer casing 35 can be rapidly and simply swung away if access should be required to the interior of the cylindrical casing 20, e.g. for cleaning or maintenance.

A preferred development of the arrangements 30', 31' of the construction with a reciprocating support member 34' has between said arrangements a random angle, the latter being measured as the angle passing through the pivot axis 36' of the support member 34' through the centre of the die and/or cutting tool arrangement 30' or 31'.

The extrusion machine according to the invention can also be used for plastic and injection moulds, in that in place of insert dies, e.g. on a horizontally projecting extruder can be arranged a vertically fitted changer with injection moulds for the metal or plastic injection in such a way that said moulds can be used in rapid order. Thus, without further disadvantages, it is possible to extend the injection follow-up cycle time and increase the cooling time, whilst displacing the ejection of the injection moulded parts to a third station. The economics of the process are greatly improved by this. Into the changer system can be integrated heating surfaces or rotary connections with steam or which are electrically supplied via sliding contacts. It is also possible to provide cooling means, the rotary connections permitting the supply of special cooling media such as cold water or sols. Such a heating means 252 and cooling means 254 are schematically depicted in FIG. 6.

The changer mechanism 3 can also be fitted on already existing extruders or worm presses of any size or design.

During the changing process the extrusion operating pressure can be reduced by appropriate, known means and controls, but the operating pressure can also be made flexible by design.

A practical example for the cost saving when using the extrusion machine according to the invention shows that for an hourly output of 6000 kg/h/extrusion press and for a price of DM 2/kg for the material processed in said press, there is a production loss of DM 12,000 for each hour during which the extruder is shutdown. If it is borne in mind that the machine must be switched off up to six times daily in order to change knives and which takes up 30 minutes, then the invention saves several million DM of production wastage in a working year of 240 days.

We claim:

1. An extrusion machine comprising:

a machine frame;

an extrusion press mounted to said frame having a material inlet opening and a material outlet opening;

a motorized drive for driving material through said extrusion press and out of said material outlet opening along a central outlet axis;

a changer mechanism located adjacent said material outlet opening of said extrusion press for placing and replacing dies and cutting tools in front of said material outlet opening without interruption of the operation of said extrusion press, said changer mechanism including at least two dies, a first support means for holding one of said dies in an operating position in front of said material outlet opening while the other said die is in a non-operating position, said first support means including a planar support member having respective receiving holes in which said dies are removably placed when in the non-operating position, said first support means mounting said dies for movement between the operating and non-operating positions in a direction substantially perpendicular to said central outlet axis, at least two cutting tools, a second support means for holding one of said cutting tools in an operating position on a side of said die in the operating position remote from said material outlet opening while the other said cutting tool is in a non-operating position where said cutting tools are removable, said second support means movably mounting said cutting tools relative to said first support means and for movement of said cutting tools between the operating and non-operating positions in a direction substantially perpendicular to said central outlet axis, moving means (a) for moving said first support means in a direction perpendicular to said central outlet axis in such a manner that said die in the operating position is moved into the non-operating position thereof while simultaneously said die in the non-operating position thereof is moved into the operating position and (b) for moving said second support means in a direction perpendicular to said central outlet axis in such a manner that said cutting tool in the operating position is moved to the non-operating position thereof while simultaneously said cutting tool in the non-operating position thereof is moved into the operating position; and a motor drive for driving said cutting tool located in the operating position.

2. An extrusion machine as claimed in claim 1 wherein said support member is circular; and wherein said changer mechanism includes (a) a changer casing in which said circular support member is mounted for rotation about a rotational axis with said at least two dies arranged radially about the rotational axis and (b) a mounting means for mounting said changer casing to said extrusion press with said rotational axis parallel but radially displaced from said central outlet axis of said material outlet opening.

3. An extrusion machine as claimed in claim 1 wherein said support member has a pitch circular construction; and wherein said changer mechanism includes (a) a changer casing in which said support member is mounted for rotation about a rotational axis with said at least two dies arranged radially about the rotational axis and (b) a mounting means for mounting said changer casing to said extrusion press with said rotational axis parallel but radially displaced from said central outlet axis of said material outlet opening.

4. An extrusion machine as claimed in claim 2 wherein said at least two dies are spaced a same distance from the rotational axis.

5. An extrusion machine as claimed in claim 1 wherein said changer mechanism includes (a) a changer casing in which said support member is mounted for translation along a translation axis with said at least two dies arranged along the translation axis and (b) a mounting means for mounting said changer casing to said extrusion press with said translation axis perpendicular to said central outlet axis of said material outlet opening.

6. An extrusion machine as claimed in claim 1 wherein said changer mechanism includes at least a third die which is mounted to said support member and which is interchangeable as well by said moving means with whichever one of said at least two dies is in the operating position.

7. An extrusion machine as claimed in claim 1 wherein said moving means includes an electric motor.

8. An extrusion machine as claimed in claim 1 wherein said moving means includes a hydraulic motor.

9. An extrusion machine as claimed in claim 1 wherein said moving means includes a motor and a drive chain between said motor and said support member.

10. An extrusion machine as claimed in claim 1 wherein said moving means includes a motor and a worm wheel drive between said motor and said support member.

11. An extrusion machine as claimed in claim 1 wherein said moving means includes a motor and a gear drive between said motor and said support member.

12. An extrusion machine as claimed in claim 1 wherein said moving means includes a motor and a rack drive between said motor and said support member.

13. An extrusion machine as claimed in claim 1 wherein each said cutting tool includes a knife arrangement, a mounting means for mounting said knife arrangement for rotation on the side of said die in said operating position which is remote from said material outlet opening and remote from said extrusion press, and wherein said motor drive includes a rotating means for rotating said knife arrangement.

14. An extrusion machine as claimed in claim 13 wherein said rotating means includes a cutting drive and at least one deflection gear between said cutting drive and said knife arrangement.

15. An extrusion machine as claimed in claim 13 wherein said rotating means includes a cutting drive and at least one differential shaft between said cutting drive and said knife arrangement.

16. An extrusion machine as claimed in claim 1 and further including a hinge means for hingedly attaching said changer mechanism to said extrusion press.

17. An extrusion machine as claimed in claim 1 and further including a screw means for securely attaching said changer mechanism to said extrusion press.

18. An extrusion machine as claimed in claim 1 wherein said extrusion press further includes one of a heating means for heating the material being driven through said extrusion press, a cooling means for cooling the material being driven through said extrusion press, or a heating and cooling means for selectively heating or cooling the material being driven through said extrusion press.

19. An extrusion machine as claimed in claim 1 wherein said changer mechanism includes (a) a changer casing in which said second support means is mounted for rotation about a rotational axis with said at least two cutting tools arranged radially about the rotational axis and (b) a mounting means for mounting said changer casing to said extrusion press with said rotational axis parallel but radially displaced from said central outlet axis of said material outlet opening.

20. An extrusion machine as claimed in claim 19 wherein said at least two cutters are spaced a same distance from the rotational axis.

21. An extrusion machine as claimed in claim 1 wherein said first support means and said second support means are moved as a unit by said moving means so that both said die and said cutting tool associated therewith can be replaced at the same time.

* * * * *